Figure 1:
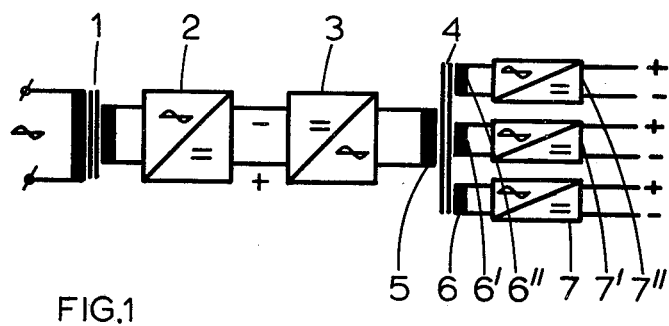

United States Patent [19]

Burrie et al.

[11] 4,024,449

[45] May 17, 1977

[54] INTRINSICALLY SAFE POWER SOURCE WITH PLURAL CONVERSIONS

[75] Inventors: Peter H. Burrie, Haren; Harmen H. Dijstelbergen, Marum; Cornelis W. Koreman, Roden, all of Netherlands

[73] Assignee: N.V. Nederlandse Gasunie, Groningen, Netherlands

[22] Filed: Mar. 27, 1975

[21] Appl. No.: 562,686

[30] Foreign Application Priority Data

Apr. 3, 1974 Netherlands ............... 7404518

[52] U.S. Cl. .................... 321/2; 321/14; 361/18; 361/88
[51] Int. Cl.[2] ........................ H02M 5/42
[58] Field of Search ........... 317/13 R, 31; 336/200, 336/232; 321/2, 14

[56] References Cited

UNITED STATES PATENTS

| | | | |
|---|---|---|---|
| 3,129,398 | 4/1964 | Lheureux | 336/200 X |
| 3,379,954 | 4/1968 | Hehenkamp | 321/14 |
| 3,409,805 | 11/1968 | Whipple et al. | 336/200 X |
| 3,624,449 | 11/1971 | Morgan | 317/31 X |

Primary Examiner—Gerald Goldberg
Attorney, Agent, or Firm—Cushman, Darby & Cushman

[57] ABSTRACT

Converter circuit, in which a 50 or 60 cps a.c. voltage is converted into a d.c. voltage, the latter into an a.c. voltage of a higher frequency, e.g. 20–80 kilocycles, which is converted by way of one transformer into one or several separate d.c. voltages. The transformer comprises a divisible ferrite core; the primary winding and one or several secondary windings are placed on opposite core parts. Each secondary winding, together with a pertaining rectifying-, smoothing- and stabilizing -circuit and a limiting resistor is installed as an intrinsically safe power source on one print. Several prints of this kind may be placed on the secondary core part, one for each power source required. The electrical values of the circuit components are subject to certain specifications.

5 Claims, 6 Drawing Figures

INTRINSICALLY SAFE POWER SOURCE WITH PLURAL CONVERSIONS

The invention relates to a converter circuit, in which a 50 or 60 cps a.c. voltage is converted into a d.c. voltage, the latter into an a.c. voltage of a higher frequency, which, in its turn, is converted by way of one transformer into one or several separate d.c. voltages.

A circuit of this kind is known from the Netherlands Pat. No. 6,916,659, in particular FIG. 3c; the embodiment of the circuit there indicated is meant for use in television sets. In the Netherlands Pat. No. 7,010,506 said circuit is already considered forming part of the known state of the art.

Under certain conditions, a converter circuit of the type referred to above can be employed to obtain one or more intrinsically safe power sources, for instance, for feeding electrical measuring and control equipment arranged in an explosion-hazardous environment. Intrinsically safe are those electric or electronic apparatuses which under no condition whatever are capable of bringing about a temperature which is sufficiently high, or a spark containing enough energy, to cause an explosion to occur.

There are several standards and specifications, published by VDE-Verlag GmbH of Germany like VDE 0171 $d$/2.65 and VDE 0165, which relate to intrinsically safe equipment. In paragraph 49 of the specification VDE 0171 $d$/2.65 is indicated within which limits the voltage, current, self-induction, capacity and resistance in an explosive environment must remain in order that intrinsically safe conditions be retained. Specifications for installation of intrinsically safe circuits are given in paragraph 8 of the specification VDE 0165. In general, the situation is such that the power dissipated in the intrinsically safe apparatus must be less than the value defined and that the self-inductions and capacitors must not exceed certain values. Further, there are often additional stipulations as regards the specifications of the components, the guarantee of safety during failure of a component and the mechanical design. Nowadays, equipment of this kind is often fed with the aid of so-called Zener barriers (Lit. Redding, Towle; Barrier Method of Ensuring the Safety of Electrical Currents in Explosive Atmospheres; proc. LEE 113, (1966) pages 2070–2074). These circuits only satisfy the specifications of VDE-0165, par. 8.h., subject to limitations. The circuit known from the Netherlands Pat. No. 6,916,659 already mentioned does not satisfy these specifications in its design indicated in said Patent Application.

The purpose of the invention is to provide an installation, in which a converter circuit as referred to in the introductory paragraph is used to obtain one or several intrinsically safe power sources in accordance with the required specifications, and which installation offers the following specific advantages:

1. complete insulation, also as regards earth;
2. a circuit which may be short-circuited without any part breaking down;
3. a low capacitive coupling between the mains earth and the equipment fed by the converter circuit;
4. a low capacitive coupling between output terminals and earth;
5. a high interference suppression of both common-mode and differential-mode interferences which may be present in the mains;
6. the possibility for the circuit which is connected to the feed to be earthed at a spot chosen arbitrarily. This makes it possible to choose the optimum spot for the earthing without being limited by earth loops, and
7. to provide several power sources in a simple manner.

The invention relates to a converter circuit, in which a 50 or 60 cps a.c. voltage is converted into a d.c. voltage, the latter into an a.c. voltage of a higher frequency, which, in its turn, is converted by way of one transformer into one or several separate d.c. voltages. According to the invention the above purpose is realized if a number of design-and electro-technical measures can be combined, which are characterized in that the transformer comprises a divisible ferrite core consisting of a first core part around which the primary winding is placed, a second core part which lies approximately opposite the first core part and around which one or more secondary windings are placed, and two yokes joining the ends of the core parts, in which the capacitive coupling between the primary winding and the secondary winding and between the secondary windings themselves is small and each secondary winding together with a pertaining rectifying-, smoothing- and stabilizing-circuit and a current limiting resistor is installed as an intrinsically safe power source on one print, whilst several prints of this kind may, parallel to each other, be placed around the secondary core part, the number being equal to the required number of power sources, that the higher frequency mentioned amounts to at least a few kilocycles, and that the number of secondary-winding turns on each print, as well as the corresponding number of primary-winding turns, the capacity of the capacitor(s) in the smoothing circuit and the current limiting resistor are so dimensioned that:

a. at a chosen output voltage with a voltage ripple of less than 1%, the capacity at the output terminals of the power source with connected, fed equipment is smaller than the capacity at which 1.5 times the chosen output voltage is equal to the ignition voltage, defined according to specification VDE 0171 $d$/2.65, par. 49, in an explosive gas mixture, in which it must be possible for the connected equipment to be used intrinsically safe;

b. the self-induction of the power source with connected equipment is smaller than the self-induction at which 1.5 times the current strength resulting from the chosen output voltage and the minimum resistance of the connected equipment, is equal to the ignition current, defined according to said specification, in said explosive gas mixture;

c. the resistance of the power source is so large that, invariably, notably also at a short-circuit in the connected circuit, both the voltage and the current remain smaller than ⅔ of any combination of voltage and current at which, in the case of said explosive gas mixture, ignition may occur according to said specification. The higher frequence is, by preference, chosen between 20 and 80 kilocycles, for instance 50 kilocycles.

Figure 2:
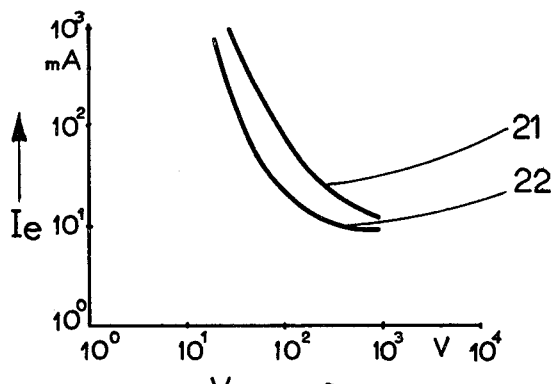
Figure 3:
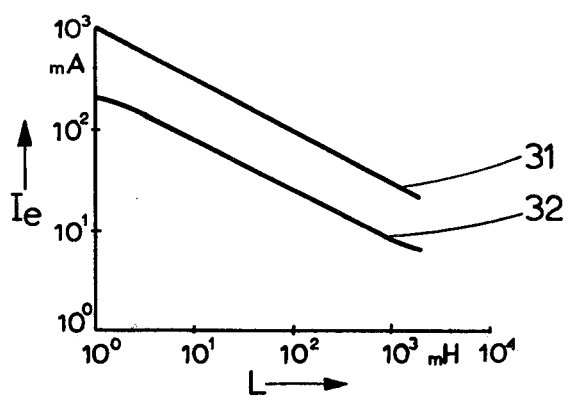
Figure 4:
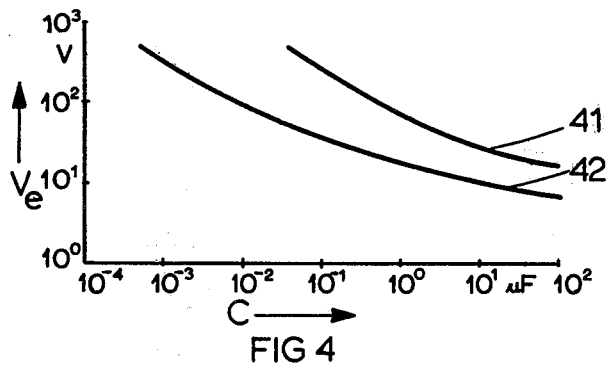

In case said explosive gas mixture should consist of either a mixture of methane and air or a mixture of hydrogen and air, specification VDE 0171, par. 49, in the graphs FIGS. 2, 3 and 4, give the relationship between the quantities mentioned under a., b., and c. above. In these cases, therefore, the converter circuit is so designed according to the invention that:

a. the higher frequency lies between 20 and 80 kilocycles;

b. the capacity at the out terminals of the power source with connected equipment is less than the capacity at which 1.5 times the chosen output voltage is equal to the ignition voltage for a mixture of methane or hydrogen, and air according to specification VDE 0171 d/2.65, par. 49, FIG. 4;

c. the self-induction of the power source with connected equipment is smaller than the self-induction at which 1.5 times the current strength, resulting from the chosen output voltage and the minimum resistance of the connected equipment, is equal to the ignition current for a mixture of methane, or hydrogen, and air according to VDE 0171 d/2.65, par. 49, FIG. 3;

d. the resistance of the power source is so large that, invariably, notably also at a short-circuit in the connected circuit, both the voltage and the current remain smaller than ⅔ of any combination of voltage and current at which, in the case of a mixture of methane, or hydrogen, and air, ignition may occur according to VDE 0171 d/2.65, par. 49, FIG. 2.

Figure 5:
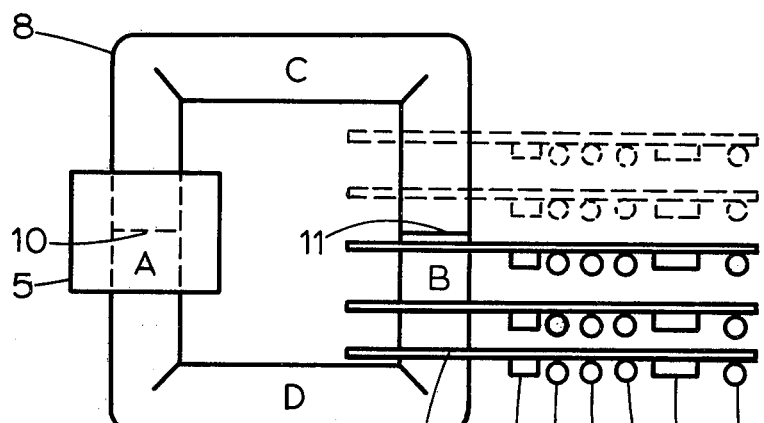
Figure 6:
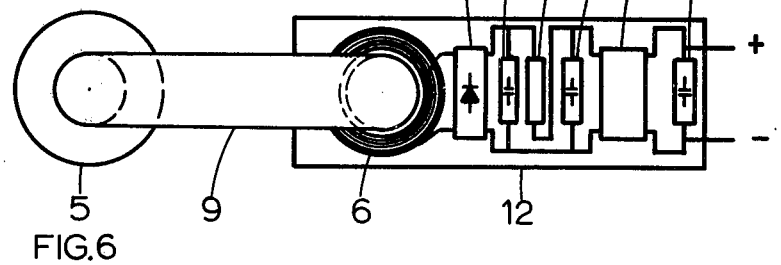

One skilled in the art will be able, with the aid of these data, to calculate in detail the values of the parts for the circuit, which will be indicated by means of calculatory example. The invention will first be elucidated with a drawing, which represents the following:

FIG. 1: a principle diagram of a circuit according to the invention;

FIG. 2: a graph, in which, for a mixture of methane, or hydrogen, and air, in the curves 21 and 22 respectively, the minimum ignition current $I_e$ is plotted as a function of the voltage $V_e$ for an Ohmic current circuit. This graph has been derived from the specification VDE 0171 d/2.65, par. 49, FIG. 2;

FIG. 3: a graph, in which, for a mixture of methane, or hydrogen, and air, in the curves 31 ans 32 respectively, the minimum ignition current $I_e$ is plotted as a function of the inductivity L, for an inductive current circuit. This graph has been derived from said specification, par. 49, FIG. 3;

FIG. 4: a graph, in which, for a mixture of methane, or hydrogen, and air, in the curves 41 and 42 respectively, the minimum ignition voltage $V_e$ is plotted as a function of the capacity C, for a capacitive current circuit. This graph has been derived from said specification, par. 49, FIG. 4;

FIG. 5: a schematic drawing of the output transformer with a few secondary prints in top view; and FIG. 6: a side-view of the transformer of FIG. 6.

According to the principle diagram represented by FIG. 1 the circuit consists of one transformer 1, which can be connected to a 50 or 60 cps mains and to which, secondarily, a rectifier 2 is connected. The transformer 1 is preferably a so-called ferro-resonant transformer, in which primary voltage variations result in only relatively small secondary voltage variations; constant-voltage transformers of this kind are commercially available. The smoothed output d.c. voltage of the rectifier 2 is supplied to a generator circuit 3, which generates an a.c. voltage having a frequency that lies preferably between 20 and 80 kilocycles, for instance 50 kilocycles. Said a.c. voltage is supplied to the primary winding 5 of a transformer 4, which is provided with a number of secondary windings 6, 6', 6''; each secondary winding 6 is connected with a rectifying-, smoothing- and stabilizing-circuit 7, 7' and 7''.

In the FIGS. 5 and 6 the way in which the parts 5 to 7 inclusive are combined into a whole is shown in detail. The magnetic circuit of the transformer 4 has the shape of a rectangle and is comprised of two parts 8 and 9 which consist of ferrite material, are preferably identical and rest against one another by the faces 10 and 11. The two sides A and B of the rectangle in which the constituent faces 10 and 11 are located form the core parts of the transformer, the other sides C and D forming two yokes which connect these core parts. On the one core part A the primary winding 5 is placed, whilst a number of secondary windings 6 may be slid on the other core part B, as required. In this embodiment, each winding 6 is applied in the form of a flat coil to a print 12, on which also the circuit indicated by the number 7 in FIG. 1 is accommodated. The parts of this circuit are the following: a rectifier 13 (for instance a Graetz circuit, made up of 4 diodes, for double rectifying), a capacitor 14, a resistor 15, a capacitor 16, a voltage stabilizer 17, and a capacitor 18. The resistor 15 has the function of a current limiting resistor and also forms part of the smoothing filter formed by the capacitors 14, 16 and 18. The rectifier 13 and the stabilizer 17 are commercially available in the form of small blocks that can be mounted on a print.

CALCULATORY EXAMPLE

An intrinsically safe feed according to the principle of the invention is asked for, with a stabilized voltage of 12 V, which feed is capable of supplying a maximum amperage of 50 mA; the feed must be usable in an explosive mixture of hydrogen and air.

It should in the first place be checked if the value of 50 mA is allowable. The voltage stabilizer 17 employed has a voltage loss of 3 V of its own at maximum current, so that the voltage before the stabilizer (with the current limiting resistor 15 being dimensioned properly) then amounts to 15 V. At a voltage, which at the required safety factor is 1.5 times as large, so 22.5 V, a minimum ignition current of over 300 mA is found in the graph FIG. 2 for said gas mixture, so that the maximum allowable amperage is upwards of 200 mA, notably a safety factor $1/1.5 = ⅔$ times as large. Therefore, a current of 50 mA is certainly allowable. Further, the minimum value R of the current limiting resistor 15 follows from this, as well as the pertaining, required output voltage $V_o$ of the rectifier 13. $V_o$ should in the first place be equal to the sum of the required voltage (12 V), the voltage loss in the stabilizer (3V) and the voltage loss at a maximum current consumption of 50 mA in the current limiting resistor, so that:

$$V_o = 12 + 3 + 50 \times 10^{-3} \times R \text{ (}V_o \text{ in Volts, R in Ohms).}$$

The current limiting resistor should further be capable of limiting the current to the above-mentioned 200 mA, which means that:

$$V_o = 200 \times 10^{-3} R.$$

From these two equations follows a value of 100 Ohms for the minimum value R of the current limiting resistor 15, and matching value of the output voltage $V_o$ of the rectifier 13 of 20 V.

With the aid of the FIGS. 3 and 4 is found that at the output terminals the self-induction and the capacity may amount to approximately 10 mH and 2 $\mu$F respectively without the intrinsic safety being harmed. For the capacitors 14, 16 and 18, three capacitors of 0.5 $\mu$F each may be taken; the ripple will then become smaller than 100 mV. It is important that in the application of the principle according to the invention the self-induction of the secondary winding does not present a problem, since, at the high frequency employed, the required number of turns is small, for instance about 10, so that said self-induction remains smaller than 1 mH. Moreover, also the transition capacity between the windings and the core is extremely small.

In FIG. 5 is indicated that the transformer is provided with three secondary prints. The prints shown by the dashed lines indicate that said number may be increased as required, so far as the space available on the core allows this. The invention is not limited to the embodiment indicated in the FIGS. 5 and 6. For instance, the windings 6 may be constructed, instead of in the form of, printed coils, as flat disc-shaped windings fixed to the prints and the embodiment of the circuit on the print may differ from that here indicated schematically, the magnetic circuit need not necessarily be rectangular, but may also have another, suitable form. These and similar variations are considered to form part of the invention as well.

What is claimed is:

1. An intrinsically safe power source comprising a converter circuit in which a 50 or 60 cps AC voltage is converted into a DC voltage, wherein the DC voltage is in turn converted into a AC voltage having a higher frequency than the initiating voltage, and wherein the higher frequency AC voltage is in turn converted into at least one source of DC voltage, said converter circuit including a transformer, said transformer comprising a divisible core having first and second portions located opposite one another, a primary winding positioned on said first portion, at least one printed circuit board having a coil fixedly attached thereto positioned on said second portion so that said coil forms a secondary winding of said transformer, said converter circuit further including circuit means connected to said coil and fixedly attached to said printed circuit board for rectifying, smoothing and stabilizing the power output of the power source wherein the output voltage is smaller than a value of the output voltage which multiplied by 1.5 would equal the minimum ignition voltage, the inductance of the power source is smaller than 10 milliHenry and the resistance of the power source limits the output voltage and current to values smaller than ⅔ of any combination of minimum ignition voltage and current values.

2. An intrinsically safe power source as in claim 1 wherein said circuit means includes a current limiting resistor, a capacitor network, a rectifier and a voltage stabilizer.

3. An intrinsically safe power source as in claim 2 wherein the minimum value of said current limiting resistor is 100 ohms and wherein the capacity of the power source is smaller than 2 micro-Farad.

4. An intrinsically safe power source as in claim 1 wherein said higher frequency AC voltage ranges between 20 to 80 kilocycles.

5. An intrinsically safe power source as in claim 4 wherein said preferred higher frequency AC voltage is 50 kilocycles.

* * * * *